Feb. 8, 1927.

M. KING, JR 1,616,499

LINEAR MEASURING DEVICE

Filed April 17, 1922

INVENTOR.
Mark King, Jr.
BY
John McClune
ATTORNEY.

Patented Feb. 8, 1927.

1,616,499

UNITED STATES PATENT OFFICE.

MARK KING, JR., OF NEW ROCHELLE, NEW YORK, ASSIGNOR TO AMERICAN TELEPHONE AND TELEGRAPH COMPANY, A CORPORATION OF NEW YORK.

LINEAR MEASURING DEVICE.

Application filed April 17, 1922. Serial No. 554,089.

This invention relates to measuring devices and particularly to means for determining the linear dimension of an object to be measured.

In the placing of electric cables or other conductors such, for example as those used for signaling or power purposes, it is often desirable to determine quickly and accurately the amount of cable that has been removed from the reel upon which such cables or conductors are placed after manufacture.

It is the object of this invention to provide means for accurately and quickly indicating or registering the linear dimension of flexible, inextensible objects, such, for example, as cables or other conductors, the said means being operated automatically by virtue of the removal of the cable from the reel or other support upon which it may be located. Furthermore, this invention is characterized by an arrangement adapted to minimize slippage between the cable to be measured and the drum of the measuring device with which the cable is in contact, thereby increasing the accuracy of measurement.

Figure 1:
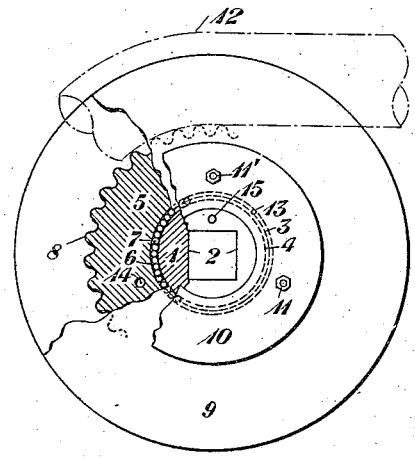
Figure 2:
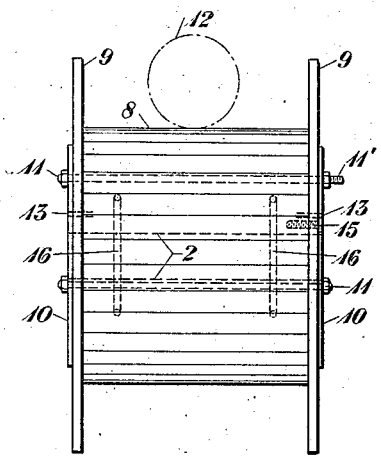
Figure 3:
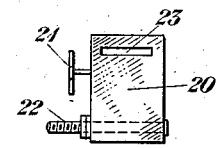
Figure 5:
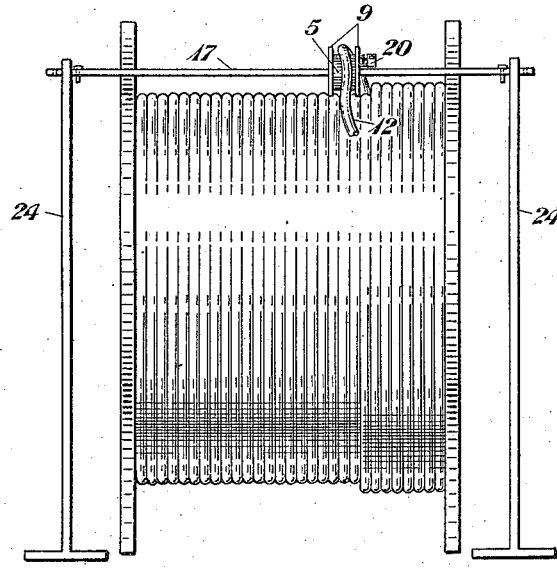
Figure 4:
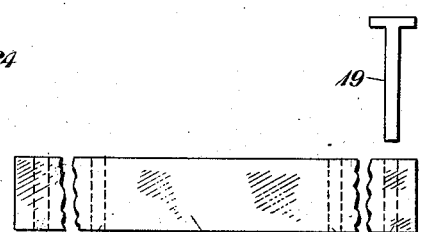

Other objects of this invention will be apparent from the following description when read in connection with the attached drawing, of which Figure 1 shows a side view of the drum upon which the object rests, and also of the spool which affords a bearing surface for the drum; Fig. 2 shows a front view of the said drum; Fig. 3 shows a meter adapted for use with the said drum; Fig. 4 shows the shaft for supporting the entire measuring device and Fig. 5 shows the manner in which this invention may be used.

In Fig. 1, which is represented as being broken in part, 1 represents a cylindrical spool having formed therein a square hole 2, which is adapted to receive a shaft in order to support the said spool and the other parts adjacent thereto. This spool, whose outer edge is represented by 3, has formed therein a plurality of grooves represented by 4. in which are placed the ball bearings 7. These grooves, which are indicated by 16 in Fig. 2, lie in planes perpendicular to the axis of the said spool. Placed over the spool and supported thereby is a drum 5, whose inner circumference 6 rests upon the ball bearings 7. The outer edge 8 of the drum 5 is not a smooth surface but is broken by undulations to present greater friction between the cable 12 and the drum 5. Attached to both sides of the drum 5 are flanges 9, which serve to keep the object to be measured in position upon the said drum. These flanges are secured by the flat rings 10, held in position by means of the bolts 11—11', which extend through the holes 14 bored longitudinally through the core of the said drum. A hole 15 formed in the one end of the spool 1 is threaded so as to receive a bolt attached to the meter shown in Fig. 3, which indicates the length of the cable passing over the drum 5. Oil holes 13 are inserted in the ring 10 in order that the bearings 7 may be properly lubricated.

Fig. 2 shows more clearly two of the holes mentioned in connection with Fig. 1. The grooves 16 which form the race-ways for the ball bearings are represented near each end of the spool upon which the drum rests. It is to be understood that any number of such grooves may be provided as is necessary to provide substantially frictionless support for the drum. The reduction of friction between the drum and the spool is one of the features of my invention since it tends to minimize the slippage of the cable over the surface of the drum and thereby renders more accurate the registered measurement.

The register shown in Fig. 3 may be of any well known type in which the registering trains are operated by means of a sprocket 21, which is advanced by means of a moving object coming in contact therewith. This register is provided with a bolt 22, fastened to the register by means of a lock-nut, and adapted to be inserted in the threaded hole 15 in one end of the spool 1. The end of the bolt 11' is made longer than the other bolts so as to engage the teeth of the sprocket 21 as the drum 5 revolves around the spool 1. The distance traversed is indicated upon the dial 23. The bolt 22 is threaded in such a direction that the rotation of the drum will tend to tighten the connection of the register to the spool.

Fig. 4 shows a shaft to be inserted in the spool 1. The dimensions of this shaft and its finish should be such that the spool may freely slide longitudinally upon the shaft but cannot rotate thereon. It will thus be seen that the spool 1 is fixed relative to the drum 5 and also that the register 20, which is rigidly fastened to the spool 1, is also fixed relative to the rotatable drum. The shaft 17 has in the ends thereof holes 18 which are adapted to receive the pins 19 for maintaining it in definite position upon the supports 24 shown in Fig. 5, or other supporting means upon which the shaft may be placed.

Having in mind the foregoing description of the parts in which this invention is embodied it will be clearly understood from the following description of the method of making a measurement.

The cable 12, or other conductor from a reel, such, for example, as shown in Fig. 5, is placed upon the periphery of the drum between the two flanges 9. The measuring device is preferably placed higher than the cable reel so that the cable will be in contact with a considerable portion of the drum 5 of the measuring device, thereby increasing the friction between the cable and the drum, and diminishing slippage. As the cable is drawn from the cable reel the drum 5 rotates freely about the spool 1, and the bolt-end 11' comes in contact with a tooth of the sprocket 21 once in each revolution of the said drum. The rotation of the sprocket actuates the registering train which indicates upon the dial 23 the linear distance traversed by a point upon the periphery of the drum. By making the spool readily slidable upon the shaft 17 the measuring device will tend to keep in alignment with the cable 12 in the course of unreeling from the cable reel, which will tend toward accuracy of measurement.

Although this invention has been described as embodied in a particular arrangement, it is to be understood that it is capable of embodiment in other and different forms within the spirit and scope of the appended claims.

What is claimed is:

1. In a measurng device, the combination with a reel comprising a rotatable flanged drum having a cylindrical opening extending therethrough, the axis of the opening coinciding with the axis of the drum, of a cylindrical spool inserted in the said opening of the drum, the said spool having friction-reducing bearings between its outer surface and the surface of the cylindrical opening in the said drum to permit the free rotation of the latter, a shaft having a non-circular cross-section extending through a non-cylindrical opening in the said spool to slidably but not rotatably support the said spool, and a register supported by the said spool and actuated by the relative motion of the said drum and the said spool.

2. In a measuring device, the combination with a reel comprising a rotatable flanged drum having a cylindrical opening extending therethrough, of a slidable spool inserted in the said opening having friction-reducing bearings between the outer surface of the said spool and the surface of the opening through the said drum to permit the free rotation of the latter, a shaft of non-circular cross-section adapted to extend through an opening in the said spool having a similar cross-section whereby the said spool is slidably but not rotatably supported, and a register supported by the said spool and actuated by the relative motion of the said drum and the said spool, and calibrated to indicate the distance traversed by a fixed point on the periphery of the said drum during its rotation.

In testimony whereof, I have signed my name to this specification this 15th day of April, 1922.

MARK KING, Jr.